US008893034B2

(12) United States Patent
King (10) Patent No.: US 8,893,034 B2
(45) Date of Patent: Nov. 18, 2014

(54) MOTION ENABLED MULTI-FRAME CHALLENGE-RESPONSE TEST

(75) Inventor: Simon P. King, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 730 days.

(21) Appl. No.: 12/695,098

(22) Filed: Jan. 27, 2010

(65) Prior Publication Data

US 2011/0185311 A1    Jul. 28, 2011

(51) Int. Cl.
*G06F 3/048* (2013.01)
*G06F 21/36* (2013.01)

(52) U.S. Cl.
CPC ...................................... *G06F 21/36* (2013.01)
USPC ........... 715/780; 715/710; 715/715; 715/726; 715/763; 715/794; 715/814

(58) Field of Classification Search
USPC .......... 715/794, 763, 710, 715, 726, 780, 814
See application file for complete search history.

(56) References Cited

U.S. PATENT DOCUMENTS

| 4,722,005 | A  | * | 1/1988  | Ledenbach ................... 348/173 |
| 5,874,991 | A  | * | 2/1999  | Steinberg et al. ............. 348/181 |
| 5,945,972 | A  | * | 8/1999  | Okumura et al. ............... 345/98 |
| 6,692,170 | B2 | * | 2/2004  | Abir .............................. 400/472 |
| 7,054,928 | B2 | * | 5/2006  | Segan et al. ................... 709/225 |
| 7,194,542 | B2 | * | 3/2007  | Segan et al. ................... 709/225 |
| 7,624,277 | B1 | * | 11/2009 | Simard et al. ................. 713/182 |
| 8,152,637 | B2 | * | 4/2012  | Watanabe et al. ............... 463/33 |
| 8,276,099 | B2 | * | 9/2012  | Yost .............................. 715/856 |
| 8,613,047 | B2 | * | 12/2013 | Chen et al. ....................... 726/3 |
| 2002/0029252 | A1 | * | 3/2002 | Segan et al. ................... 709/217 |
| 2002/0122197 | A1 | * | 9/2002 | Abir .............................. 358/1.11 |
| 2003/0219146 | A1 | * | 11/2003 | Jepson et al. ................. 382/103 |
| 2005/0197164 | A1 | * | 9/2005 | Chan ............................. 455/566 |
| 2006/0168144 | A1 | * | 7/2006 | Segan et al. ................... 709/219 |
| 2007/0250898 | A1 | * | 10/2007 | Scanlon et al. ............... 725/135 |
| 2007/0252804 | A1 | * | 11/2007 | Engel et al. ..................... 345/98 |
| 2007/0294644 | A1 | * | 12/2007 | Yost .............................. 715/856 |
| 2008/0077863 | A1 | * | 3/2008 | Jong et al. ..................... 715/277 |
| 2008/0127302 | A1 | * | 5/2008 | Qvarfordt et al. ................. 726/2 |
| 2008/0158257 | A1 | * | 7/2008 | Bobrow et al. ............... 345/629 |
| 2008/0170751 | A1 | * | 7/2008 | Lei et al. ....................... 382/103 |
| 2008/0175482 | A1 | * | 7/2008 | Ma et al. ....................... 382/190 |

(Continued)

OTHER PUBLICATIONS

Bing Search q=captcha+invisible+static+frames&qs Aug. 10, 2014.*

(Continued)

*Primary Examiner* — Boris Pesin
*Assistant Examiner* — John Heffington
(74) *Attorney, Agent, or Firm* — Martine Penilla Group, LLP (57) ABSTRACT

A method for generating a multi-frame image rendering of a challenge-response test on a display is presented. The method begins by identifying a pattern with graphical elements, and a display region for rendering an entry object of the multi-frame image of the challenge-response test. Then a foreground sampling window having a non-patterned area defined by the entry object is defined. The foreground sampling window captures graphical elements of the pattern along a first path. In addition, a background sampling window that captures graphical elements of the pattern along a second path is defined. The foreground sampling window is overlaid on the background sampling window at the display region of the display, such that the entry object of the challenge-response test is discernable from the pattern during a period of time when multiple frames are rendered.

20 Claims, 11 Drawing Sheets

(56) References Cited

U.S. PATENT DOCUMENTS

| | | | |
|---|---|---|---|
| 2009/0080729 A1* | 3/2009 | Zhang et al. | 382/128 |
| 2009/0089706 A1* | 4/2009 | Furches et al. | 715/787 |
| 2009/0165046 A1* | 6/2009 | Stallings et al. | 725/39 |
| 2009/0292980 A1* | 11/2009 | Swineford et al. | 715/202 |
| 2010/0045799 A1* | 2/2010 | Lei et al. | 348/169 |
| 2010/0061462 A1* | 3/2010 | Ichiki | 375/240.16 |
| 2010/0066662 A1* | 3/2010 | Tomisawa et al. | 345/156 |
| 2010/0073568 A1* | 3/2010 | Van Ostrand et al. | 348/578 |
| 2010/0106464 A1* | 4/2010 | Hlasny et al. | 703/1 |
| 2010/0118049 A1* | 5/2010 | Bobrow et al. | 345/619 |
| 2010/0165112 A1* | 7/2010 | Scanlon et al. | 348/169 |
| 2010/0168881 A1* | 7/2010 | Weber et al. | 700/94 |
| 2010/0169389 A1* | 7/2010 | Weber et al. | 707/804 |
| 2010/0205667 A1* | 8/2010 | Anderson et al. | 726/19 |
| 2011/0004835 A1* | 1/2011 | Yanchar et al. | 715/763 |
| 2011/0044536 A1* | 2/2011 | Cobb et al. | 382/165 |
| 2011/0051992 A1* | 3/2011 | Cobb et al. | 382/100 |
| 2011/0052067 A1* | 3/2011 | Cobb et al. | 382/190 |
| 2011/0052068 A1* | 3/2011 | Cobb et al. | 382/190 |
| 2011/0064267 A1* | 3/2011 | Cobb et al. | 382/103 |
| 2011/0064268 A1* | 3/2011 | Cobb et al. | 382/103 |
| 2011/0261050 A1* | 10/2011 | Smolic et al. | 345/419 |
| 2011/0276663 A1* | 11/2011 | Rhoads | 709/219 |
| 2012/0038459 A1* | 2/2012 | Hindus et al. | 340/6.1 |

OTHER PUBLICATIONS

Bing Search q=invisible+static+frames&qs=n&form= Aug. 10, 2014.*

S. King, *"Multi-Step Challenge-Response Test"*, U.S. Appl. No. 12/873,140, filed Aug. 31, 2010.

Captcha, Wikipedia, the free encyclopedia, Nov. 9, 2009, pp. 1-8, http://en.wikipedia.org/wiki/Captcha.

* cited by examiner

MOTION ENABLED MULTI-FRAME
CHALLENGE-RESPONSE TEST

BACKGROUND

CAPTCHAs (Completely Automated Public Turing test to tell Computers and Humans Apart) are often used to ensure that information submitted to a computer system was submitted by a human rather than a computer. A CAPTCHA is a type of challenge-response test used to ensure that a response is not generated by a computer and are commonly used to prevent automated software from performing actions which degrade the quality of service of a given system, whether due to abuse or resource expenditure. The authentication process usually involves the system requesting a user to complete a simple test which the system is able to generate and grade. Assuming attacking computers are unable to solve the CAPTCHA, any user entering a correct solution is presumed to be human. The most common type of CAPTCHA in use requires the user enter letters or digits from a distorted image that appears on a display screen.

Automated approaches to defeat the use of CAPTCHAs usually involve the use of optical character recognition (OCR). OCR is used by the attacking computer to "read" the letters or digits by analyzing a captured image of the CAPTCHA. The use of OCR has been countered by distorting the letters and digits forming the CAPTCHA in such a way that OCR can not solve the CAPTCHA, but humans can still perceive the letters and digits. In the meantime, OCR techniques have advanced to the point where standard distorted text-based CAPTCHAs require so much deformation to authenticate the user that the CAPCHAs in many cases are difficult for humans to read.

It is in this context that embodiments of the invention arise.

SUMMARY

Broadly speaking, the present invention fills these needs by providing a method and apparatus for generating multi-frame challenge-response tests using motion. In one embodiment, the relative motion between the foreground and background of the challenge-response test obscures the entry object from automated computing systems, while allowing human users to readily solve the challenge-response test. It should be appreciated that the present invention can be implemented in numerous ways, including as a method, a system, or a device. Several inventive embodiments of the present invention are described below.

In accordance with one aspect of the invention, a method for generating a multi-frame image rendering of a challenge-response test on a display is detailed. The method begins by identifying a pattern with graphical elements, and a display region for rendering an entry object of the multi-frame image of the challenge-response test. Then a foreground sampling window having a non-patterned area defined by the entry object is defined. The foreground sampling window captures graphical elements of the pattern along a first path. In addition, a background sampling window that captures graphical elements of the pattern along a second path is defined. The foreground sampling window is overlaid on the background sampling window at the display region of the display, such that the entry object of the challenge-response test is discernable from the pattern during a period of time when multiple frames are rendered.

In accordance with another aspect of the invention, a computing system for authenticating access using a multi-frame image rendering of a challenge-response test is provided. The computing system has a processor with a test generation engine for generating an entry object of the multi-frame challenge-response test, and identifying a pattern with graphical elements. The processor further includes a pattern sampling engine that defines a foreground sampling window a non-patterned area defined by the entry object of the test generation engine. In addition, the pattern sampling engine defines background sampling window, and both the foreground sampling window and background sampling windows capture the graphical elements of the pattern while moving along a first and second path, respectively, across the pattern. An overlay engine of the processor overlays contents foreground sampling window on the contents of background sampling window. A display renderer engine of the processor renders multiple frames the challenge-response test, such that the entry object is discernable from the pattern when multiple frames are rendered.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 1A-1-5 illustrates exemplary patterns that can be used to generate a multiple frame challenge-response test, in accordance with one embodiment of the present invention.

FIG. 1D-1 illustrates overlaying a foreground sampling window over a background sampling window to render a multi-frame challenge-response test on a webpage, in accordance with one embodiment of the present invention.

FIG. 1D-2 illustrates a close up view of overlaying a foreground sampling window over a background sampling window to render a multi-frame challenge-response test, in accordance with one embodiment of the present invention.

DETAILED DESCRIPTION

The following embodiments describe an apparatus and method for generating multi-frame challenge-response tests using motion. The challenge-response test can be located in a display region of a webpage or a program screen to prevent access to automated computers for exemplary functions that include e-mailing content of the webpage, log on to an account, or perform a transaction. It will be obvious, however, to one skilled in the art, that the present invention may be practiced without some or all of these specific details. In other instances, well known process operations have not been described in detail in order not to unnecessarily obscure the present invention.

Humans are much better at tracking motion than machines. This deficiency in machine systems is exploited to create a text-based multi-frame challenge-response test using standard, non-warped characters which a human can discern from a pattern, but which would are difficult for an attacking computer to interpret. The generated multi-frame challenge-response test uses a foreground sampling window and a background sampling window that samples part of pattern. The foreground sampling window has a non-patterned area that contains an entry object of the multi-frame challenge-response test, which are the characters that need to be entered by the user. As a snapshot, a static fame of the multi-frame challenge-response test appears as a field of uniform noise. Only when multiple frames of the multi-frame challenge-response test are rendered is the entry object discernable from the pattern. Embodiments described below generate multi-frame challenge-response test using motion that are human-solvable, but extremely difficult for attacking computers to solve.

Figure 1A:
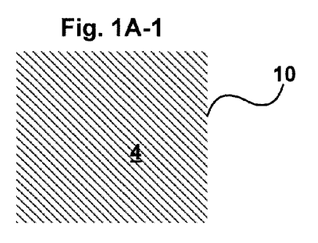
Figure 1A:
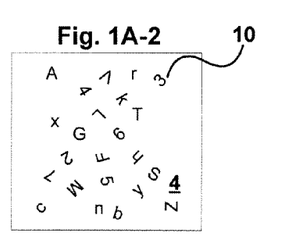
Figure 1A:
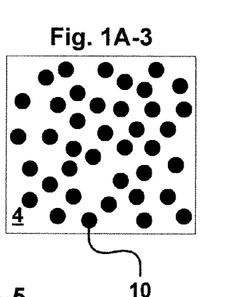
Figure 1A:
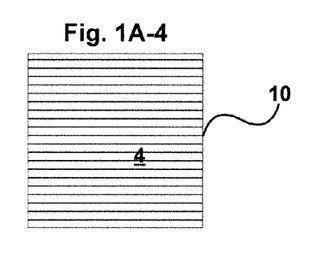
Figure 1A:
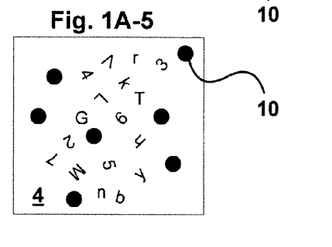

FIGS. 1A-1-5 illustrates exemplary patterns that can be used to generate a multiple frame challenge-response test, in accordance with one embodiment of the present invention. The multi-frame challenge-response test uses patterns 4 defined by graphical elements 10. Graphical elements 10 of the pattern 4 should be broadly construed to include lines, alpha-numeric characters, dots, symbols, random shapes, characters in non-Latin scripts, any combination of these graphical elements 10, etc. In one embodiment, the pattern 4 has a substantially uniform distribution of graphical elements 10. The exemplary patterns 4 and graphical elements 10 of FIGS. 1A-1-5 are for illustrative purposes, and as such, are not meant to limit the patterns 4 or graphical elements 10 that can be used to implement the present invention.

Figure 1B:
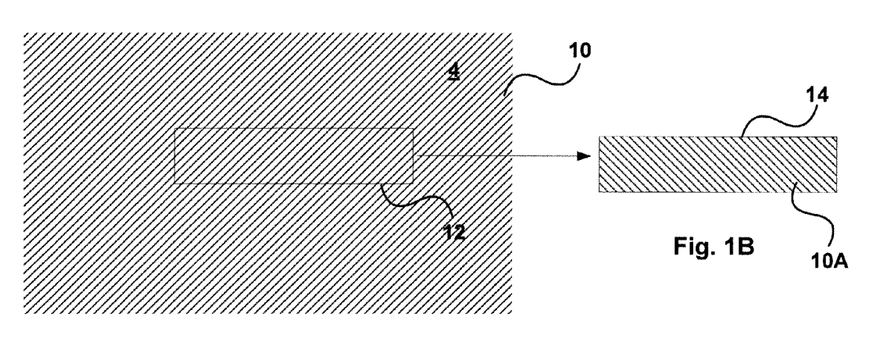
FIG. 1B illustrates a background sampling window capturing the graphical elements of a pattern, in accordance with one embodiment of the present invention.

FIG. 1B illustrates a background sampling window capturing the graphical elements of a pattern, in accordance with one embodiment of the present invention. The background sampling window 12 captures the graphical elements 10A of the pattern 4. At any moment in time, the content of the background sampling window 12 is presented in the display region 14 of a display. Shapes of the background sampling window 12 should be broadly construed to include rectangles, squares, circles, parallelograms, trapezoids, ellipses, or any other closed shapes.

Figure 1C:
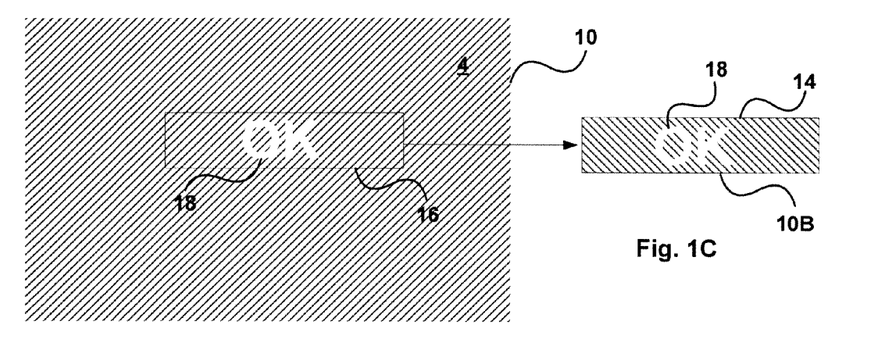
FIG. 1C illustrates a foreground sampling window capturing the graphical elements of a pattern, in accordance with one embodiment of the present invention.
Figure 1D:
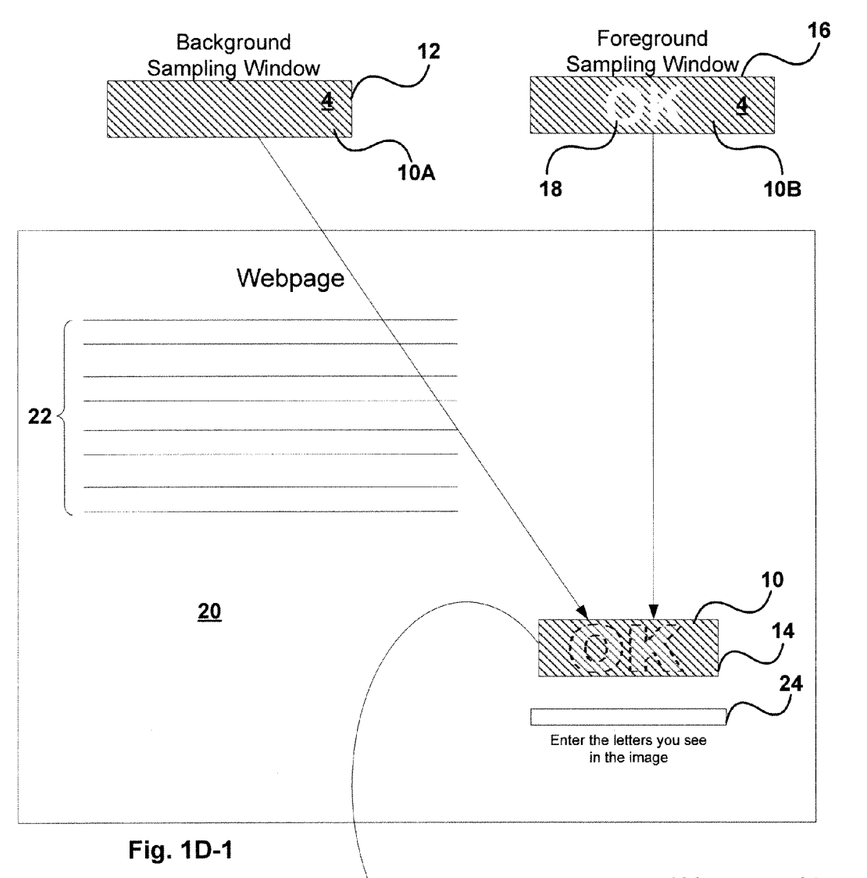
Figure 1D:
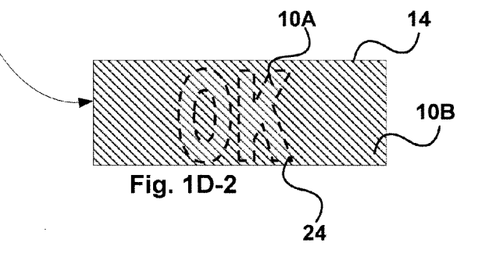

FIG. 1C illustrates a foreground sampling window capturing the graphical elements of a pattern, in accordance with one embodiment of the present invention. The function of the foreground sampling window 16 is to capture the graphical elements 10B of the pattern 4. The foreground sampling window 16 differs from the background sampling window in that the foreground sampling window 16 has a non-patterned area 18. The foreground sampling window 16 captures the graphical elements 10B of the pattern 4 except in the non-patterned area 18. When the contents of the foreground sampling window 16 are presented in the display region 14 of the display, the display region 14 shows the captured graphical elements 10A except in the non-patterned area 18. In one embodiment, the non-patterned area 18 of the foreground sampling window 16 is defined by the entry object of the multi-frame challenge-response test to be rendered. For example, the non-patterned area 18 defined by the entry object forms the word "OK". In one embodiment, the foreground sampling window 16 and the background sampling window have a substantially identical shape.

FIG. 1D-1 illustrates overlaying a foreground sampling window over a background sampling window to render a multi-frame challenge-response test on a webpage, in accordance with one embodiment of the present invention. An exemplary webpage 20 displays content 22, and in many cases includes the ability to log on to an account through the webpage 20, e-mail content 22 from the webpage, or perform a transaction through the webpage 20. Often these exemplary functions of the webpage 20 are targets of attacks by automated systems of attacking computers, and are countered by using a challenge-response test to distinguish if a human or an attacking computer is requesting the action. Typically, the challenge-response test is rendered in the display region 14 of the webpage 20 and the user is required to type in the characters shown in the challenge-response test in the appropriate field 24. In one embodiment, the background sampling window 12 and the foreground sampling window 16 with the non-patterned area 18 captures the graphical elements 10A and 10B of the pattern, as illustrated in FIGS. 1B-C. The basis for rendering the multi-frame challenge-response test in the display region 14 of a webpage 20 is the overlaying of the foreground sampling window 16 on the background sampling window 12. The pattern illustrated in FIGS. 1B-C are used for illustrate a specific embodiment, but any pattern with a substantially uniform distribution of graphical elements 10 can be used.

FIG. 1D-2 illustrates a close up view of overlaying a foreground sampling window over a background sampling window to render a multi-frame challenge-response test, in accordance with one embodiment of the present invention. As seen in the close-up view of the display region 14 of the webpage 20, display region 14 renders a combination of the graphic elements 10B contained in the foreground sampling window 16 with the graphic elements 10A contained in the background sampling window 12, which are visible through the non-patterned area 18 of the foreground sampling window 16. In one embodiment, the non-patterned area 18 of the foreground sampling window 16 is defined by the unaltered alpha-numeric characters of the entry object 24. Still further, since the entry object 24 uses unaltered characters, the non-patterned area 18 can be defining using characters of any written language.

FIGS. 2A-D illustrate exemplary movement of a foreground sampling window and a background sampling window as a function of time, in accordance with one embodiment of the present invention. If the graphical elements 10 of the pattern 4 are captured by the foreground sampling window 16 moving along one path, while the graphical elements 10 of the pattern 4 captured by the background sampling window 12 moving along a different path over a series of frames, the human eye can discern the entry object from the pattern 4, as illustrated in FIG. 1C. FIGS. 2A-D illustrate exemplary movements of the position foreground sampling window 16 relative to the background sampling window 12, which can be used to implement the present invention.

Figure 2A:
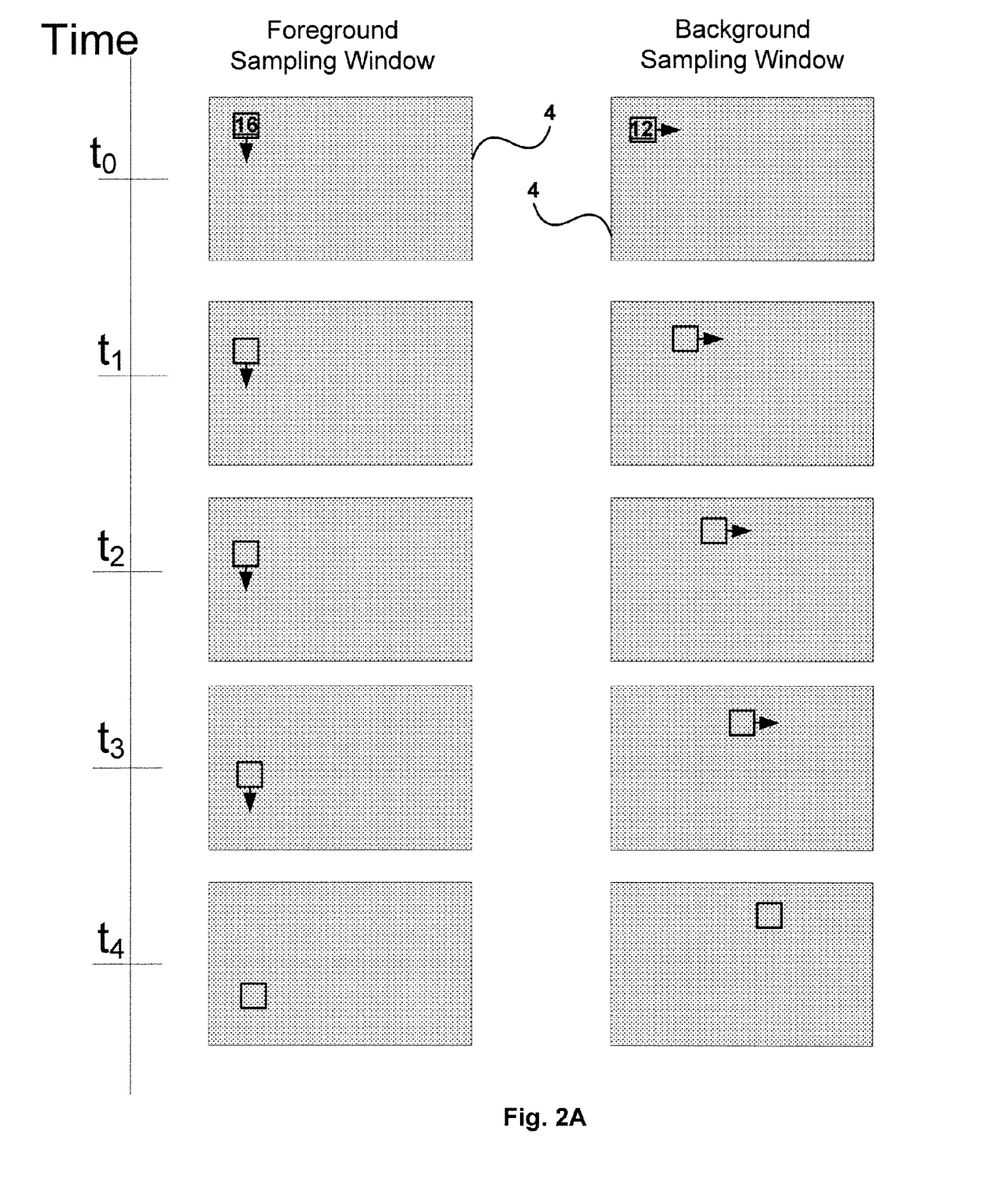
FIGS. 2A-D illustrate exemplary movement of a foreground sampling window and a background sampling window as a function of time, in accordance with one embodiment of the present invention.

FIG. 2A illustrates an exemplary relative movement between the background sampling window 12 and the foreground sampling window 16. In one embodiment, the background sampling window 12 and the foreground sampling window 16 are initially located in substantially the same position of the pattern 4. At time $t_1$, the position of the foreground sampling window 16 moves in a downward path, while the position of the background sampling window 12 moves along a path that is perpendicular to the path of the foreground sampling window 16. The term path, as used herein, describes changes of position as a function of time and should be broadly construed to include any movement, linear or non-linear, as well as periodic or non-cyclic movements of the background sampling window 12 and the foreground sampling window 16. The position of the background sampling window 12 and the foreground sampling window 16 moves at the same rate. As time advances from $t_1$ to $t_4$, both the foreground sampling window 16 and the background sampling window 12 capture the graphical elements 10 of the pattern as the position of the foreground sampling window 16 and the background sampling window 12 moves along the pattern. Still further, the foreground sampling window 16 and the background sampling window 12 move with substantially the same rate of movement.

Figure 2B:
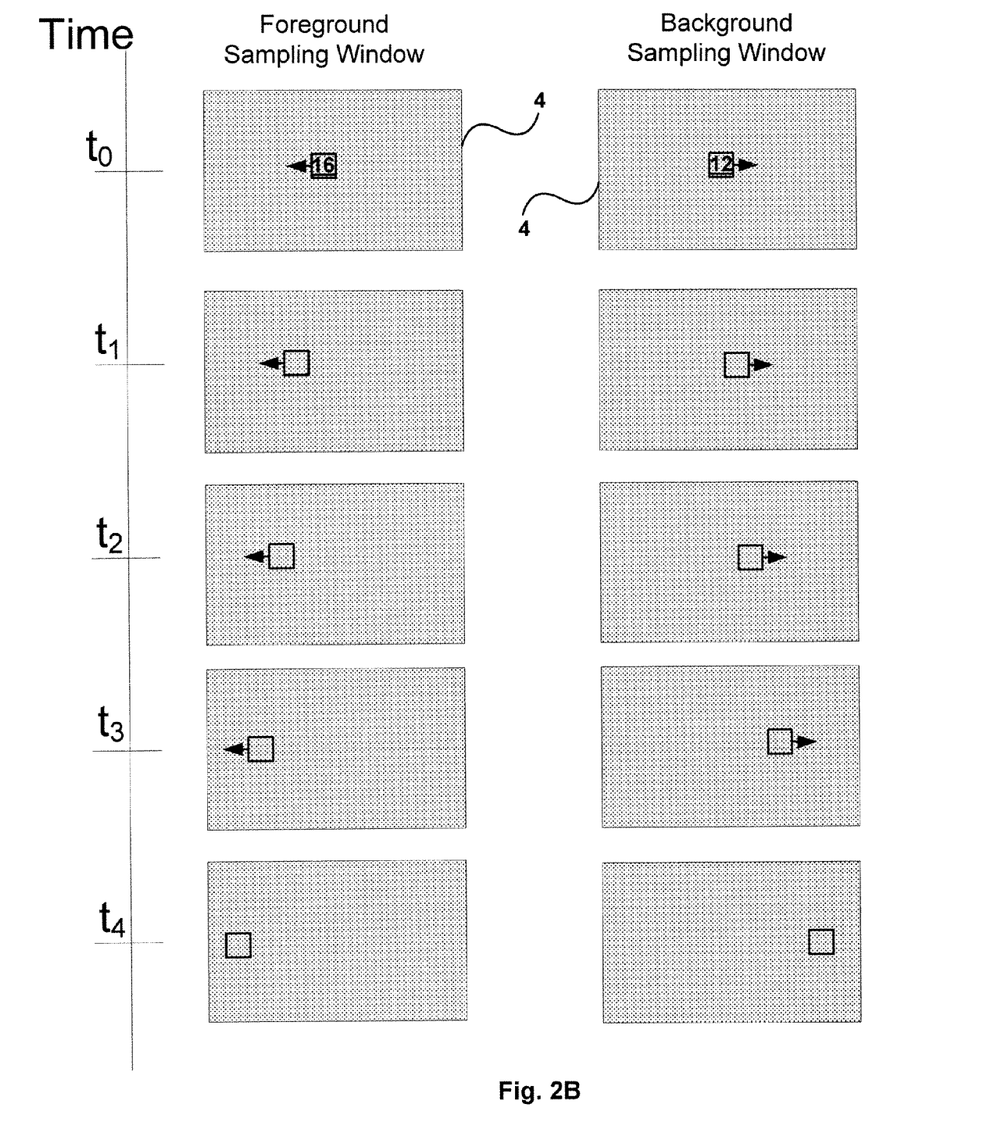

FIG. 2B illustrates a second exemplary relative movement between the background sampling window 12 and the foreground sampling window 16. In another embodiment, the background sampling window 12 and the foreground sampling window 16 are initially located in substantially the same position of the pattern 4. At time $t_1$, the position of the foreground sampling window 16 moves along a path across the pattern 4, while the position of the background sampling window 12 moves along a path that is substantially the opposite of the path of the foreground sampling window 16. As discussed in reference to FIG. 2A, the position of the background sampling window 12 and the foreground sampling window 16 moves at substantially the same rate. Also as time advances from $t_1$ to $t_4$, both the foreground sampling window 16 and the background sampling window 12 capture the graphical elements 10 of the pattern as the position of the sampling windows 12 and 16 moves along their respective paths across the pattern.

Figure 2C:
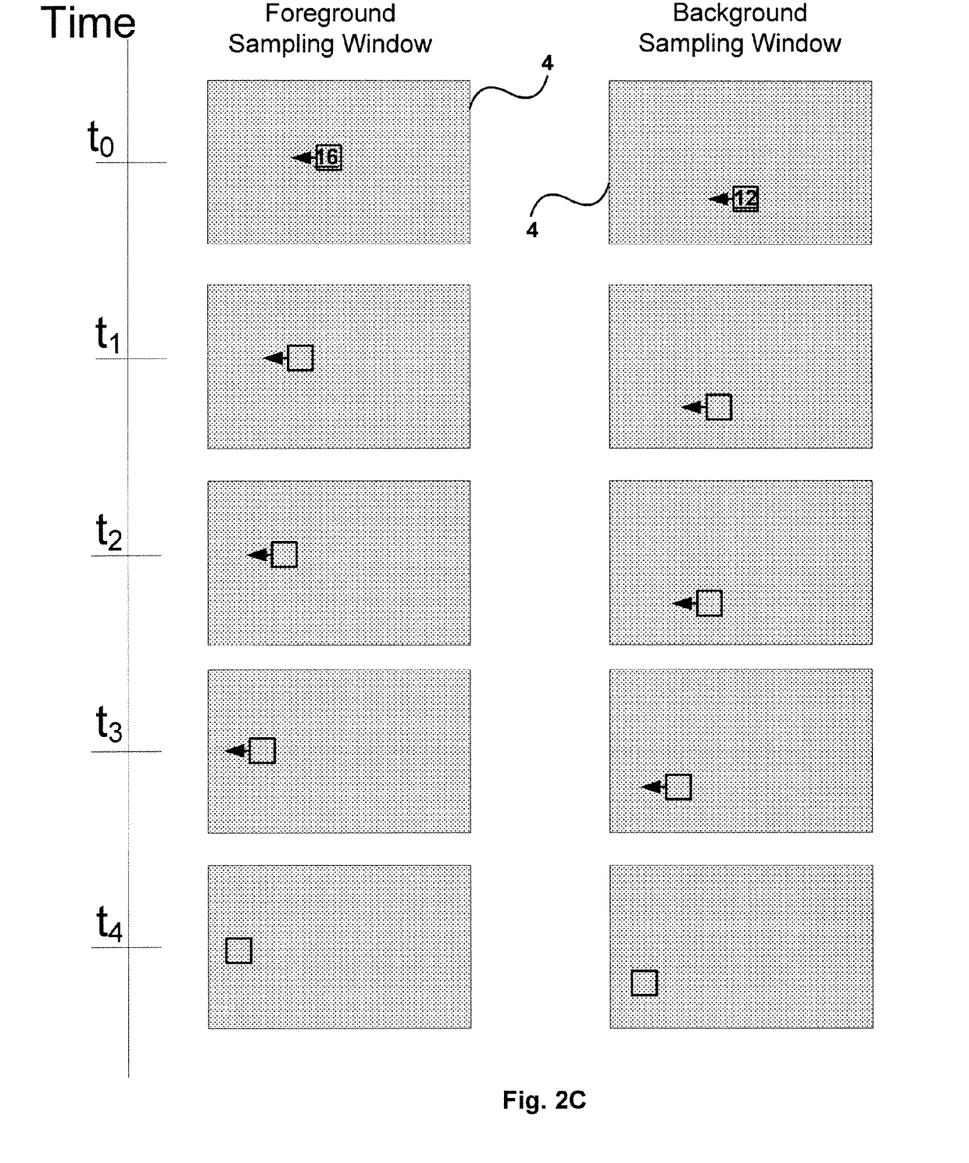

FIG. 2C illustrates a third exemplary movement between the background sampling window 12 and the foreground sampling window 16. In yet another embodiment, the background sampling window 12 and the foreground sampling window 16 are initially located in different positions of the pattern 4. At e $t_1$, the position of the foreground sampling window 16 moves along a path across the pattern 4, while the position background sampling window 12 moves along a path that is analogous to the path of the foreground sampling window 16. As discussed in reference to FIG. 2A, the position of the background sampling window 12 and the foreground sampling window 16 moves at substantially the same rate. Also as time advances from $t_1$ to $t_4$, both the foreground sampling window 16 and the background sampling window 12 capture the graphical elements 10 of the pattern as the sampling windows 12 and 16 move along their respective paths across the pattern.

Figure 2D:
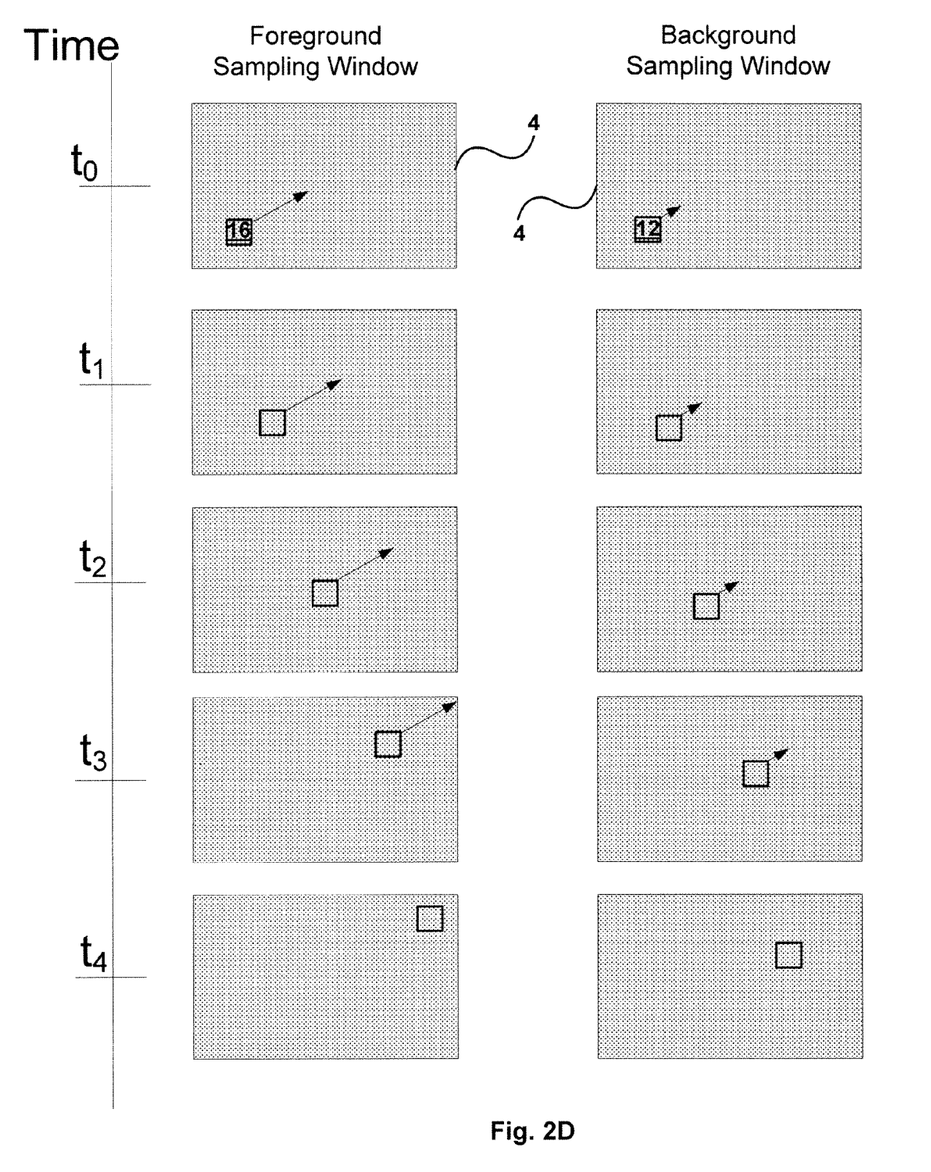

FIG. 2D illustrates a fourth exemplary movement between the background sampling window 12 and the foreground sampling window 16. According to an embodiment of the present invention, the background sampling window 12 and the foreground sampling window 16 are initially located at substantially the same position of the pattern 4. Starting at time $t_1$, the position of the foreground sampling window 16 moves along a path across the pattern 4, while the position background sampling window 12 moves along a path that is analogous to the path of the foreground sampling window 16. The rate at which the position the foreground sampling window 16 moves is different relative to the rate the position the background sampling window 16 moves, the foreground sampling window 16 and the background sampling window 16 are capturing graphical elements 10 at different positions of the pattern 4 after time $t_0$.

Figure 2E:
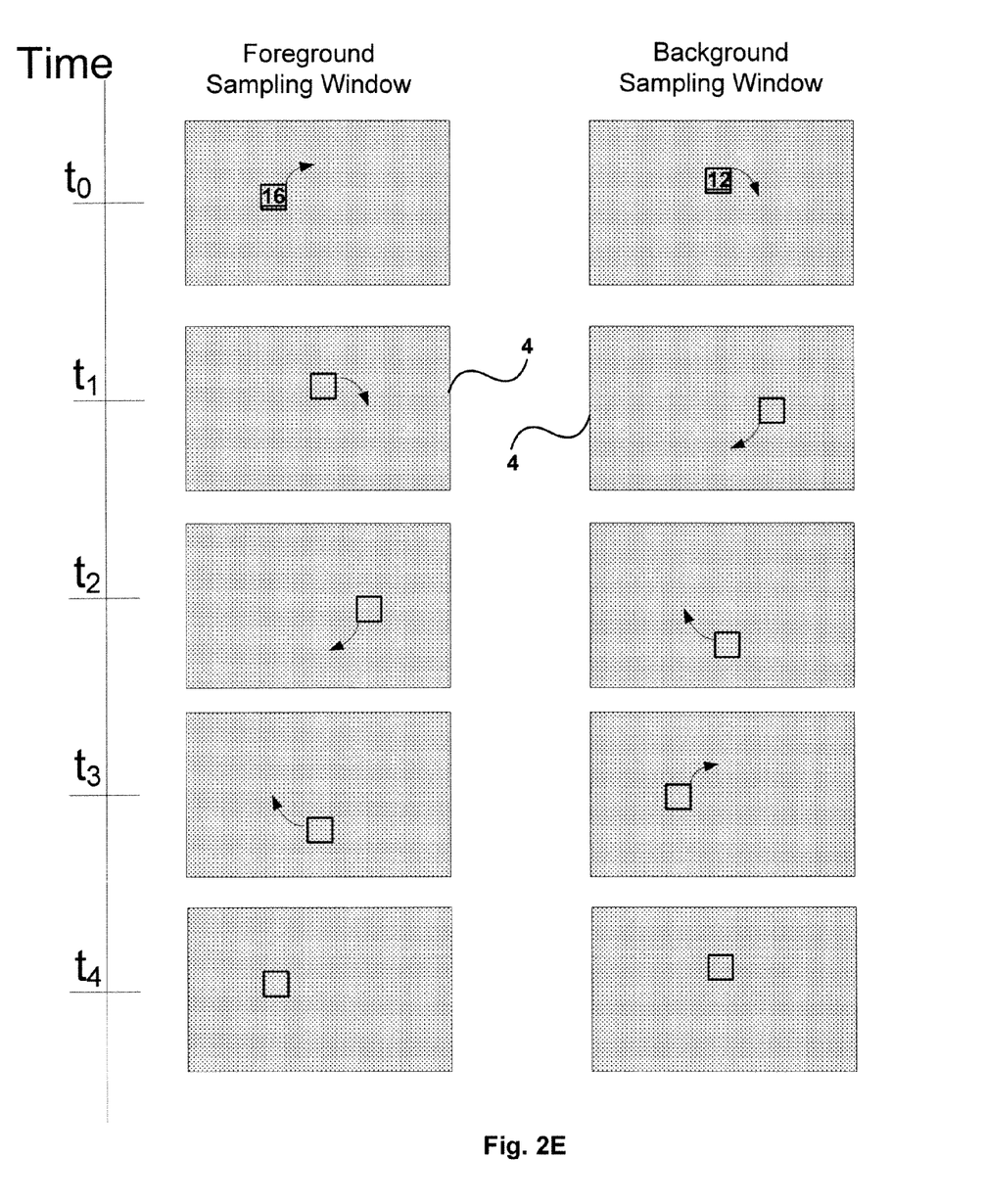
FIG. 2E illustrates an exemplary non-linear movement between the background sampling window and the foreground sampling window.

FIG. 2E illustrates an exemplary non-linear movement between the background sampling window 12 and the foreground sampling window 16. The position of the background sampling window 12 and the background sampling window 16 can include non-linear movements, such as circular movements. Starting at time $t_1$, the position of the foreground sampling window 16 moves along a non-linear path the across the pattern 4, while the position background sampling window 12 moves along another non-linear path. As described above, the foreground sampling window 16 and the background sampling window 16 capture graphical elements 10 at different positions of the pattern 4 after time $t_0$. In one embodiment, the non-linear paths are circular, and still further the position of the foreground sampling window 16 and the background sampling window 12 is substantially the same at time $t_4$ as at time $t_0$.

The exemplary movements of FIGS. 2A-E are provided for illustrative purposes, and are not limiting. It is well understood in the art that any methodology that uses the exemplary movements or any combination of the described movements may be used to implement the embodiments of the present invention. Any methodology creates a different move vector, i.e. position or rate, between the foreground sampling window 16 and the background 12 are applicable to the present invention. Still further, it is well understood in the art, that the embodiments described below can be implemented using a pattern 4 that is modified at each time $t_0$-$t_4$, instead of the foreground sampling window 16 and the background sampling window 12 that moves across the pattern 4, as described above.

Figure 3:
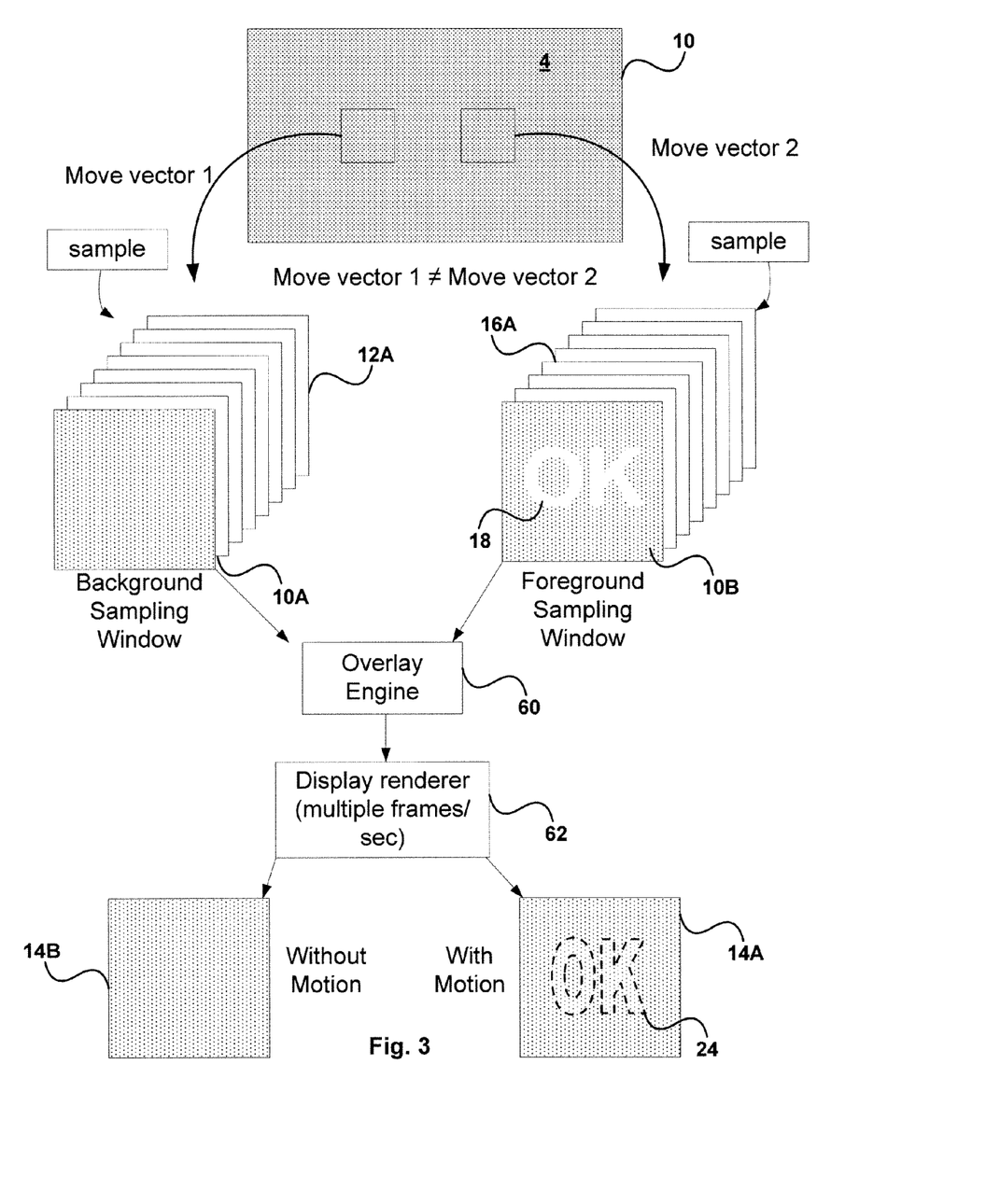
FIG. 3 illustrates rendering a multi-frame challenge response test, in accordance with one embodiment of the present invention.

FIG. 3 illustrates rendering a multi-frame challenge response test, in accordance with one embodiment of the present invention. To increase the difficulty attacking systems would have to discern the entry object of the challenge-response test, the distribution of the graphical elements 10 of the pattern 4 can vary as a function of time. In one embodiment, the graphical elements 10 of the pattern 4 have an initial distribution that is substantially uniform and move as a cohesive unit. In other words, the relative position of the graphical elements 10 stays constant and the graphical elements 10 are translated across the pattern 4. Furthermore, randomness can be introduced to the pattern 4 by having the initial rate of movement of the graphical elements 10 vary by a random amount, having the rate of movement of the graphical elements 10 change slightly over time, or having graphical elements 10 have a limited lifetime, where after a few frames, a portion of the graphical elements 10 will disappear and then reappear in a new random location.

Creating a pattern 4 can start with a set number of graphical elements 10. Still further each graphical element 10 can be assigned a random initial position, a random lifetime, or a rate of movement. In one embodiment, the rate of movement of the graphical elements 10 is a slight random variation from the initial rate of movement of the foreground sampling window 16 or the background sampling window 12. After generating each frame of the challenge-response test, graphical elements 10 are assigned a new position based on the position of the graphical element 10 in the previous frame, and the rate of movement associated with the graphical element 10. In addition, the lifetime of the graphical elements 10 is decremented as each frame of the multi-frame challenge-response test is generated. When the lifetime of a graphical element 10 reaches zero, the graphical element 10 is assigned a new random position, and a new rate of movement. After the lifetime of a graphical element reaches zero, a new position and lifetime are randomly assigned to the graphical element 10.

As illustrated in FIGS. 1B-C, the background sampling window 12 and the foreground sampling window 16 capture graphical elements 10 of the pattern 4. The foreground sampling window 16 captures graphical elements 10B of the pattern 4, except in the non-patterned area 18 that forms the shape of the entry object of the challenge response test. Both the foreground sampling window 16 and the background sampling window 12 have an associated move vector that is the position of each sampling window 12 and 16 has an associated rate and a direction. In one embodiment, the move vector of the background sampling window 12 has a different move vector than the foreground sampling window 16. Samples 16A of the foreground sampling window 16 contain the graphical elements 10B captured by the foreground sampling window 16 at a given time. Similarly samples 12A from the background sampling window 12 contain the graphical elements 10A captured at a given time. In one embodiment, the foreground sampling window 16 can be divided into multiple regions, such that each region contains an unbroken portion of the entry object of the challenge-response test. Still further, each region of the foreground sampling window 16 moves along a different path while capturing the graphical elements 10B of the pattern 4.

The samples 16A of the foreground sampling window 16 are overlaid over samples 12A of the background sampling window 12 through an overlay engine 60. In one embodiment, the overlay engine 60 overlays the sample 16A from the foreground sampling window 16 over the corresponding sample 12A from the background sampling window 12. The result of overlaying the sample 16A from the foreground sampling window 16 over the sample 12A of the background sampling window 16 is an overlaid frame. The overlaid frames are transmitted to a display render 62. The display renderer 62 receives the overlaid frames from the overlay engine 60, and generates a loop of multiple sequential overlaid frames. In one embodiment, the positions of the background sampling window 12 and the foreground sampling window 16 at the end of the loop is substantially the same as the beginning of the loop. This allows a loop of multiple frames to be rendered without an abrupt twitch when the multiple frame loop restarts from the beginning of the loop.

The loop of multiple sequential overlaid frames is transmitted from the display renderer 62 and rendered at a rate of multiple frames per second in the display region 14 of the display. The entry object 24 of the challenge-response test is not discernable from the pattern 4 when the background sampling window 12 and the foreground sampling window 16 are fixed to a position and are rendered in the display region 14B of the display. In one embodiment, the frame with the static foreground sampling window 16 and background sampling window 12 appears to be a field of uniform noise when rendered in the display region 14B. Still further, the entry object 24 of the challenge response test is discernable during a period of time when the loop of multiple overlaid frames is rendered in the display region 14A due to the differing move vectors of the foreground sampling window 16 and the background sampling window 12. In other words, the relative difference in motion between the background sampling window 12 and the foreground sampling window 16, allows a user to discern the shape of the entry object 24 of the challenge response test rendered in the display region 14B.

It is possible that an attacking computing system might be able to track the relative movement between the graphical elements 10A of the background sampling window 12 and the graphical elements 10B of the foreground sampling window 16 to discern the entry object 24 of the challenge-response test rendered in the display region 14B. To increase the difficulty for attacking computing systems to discern the entry object 24 of the rendered challenge-response test, the pattern 4 can be modified over time as discussed above. Frames of the graphical elements 10B of the foreground sampling window 16 are overlaid over the graphical elements 10A of the background sampling window 12 are created using a pattern 4 with randomly moving graphical elements 10, as discussed above.

As discussed above, the graphical elements 10A of the background sampling window 12 are visible in the non-patterned area 18 of the foreground sampling window 16, and the graphical elements 10B of the foreground sampling window 16 are visible in the remainder of the display region 14. Since the graphical elements 10 of the pattern 4 are randomized using the same methodology, a single frame has a substantially uniform distribution of graphical elements 10. Randomization of the graphical elements 10 of the pattern is particularly effective when the size of the graphical elements 10 of the pattern 4 is small relative to the size of the non-patterned area 18 of the foreground sampling window 16 that forms the entry object 24 of the challenge-response test.

During the period of time when multiple frames of the challenge-response test are rendered in rapid succession, the entry object 24 of the challenge-response test is discernable from the pattern 4. For example, over a period of time when approximately seven or eight frames of the challenge-response test are rendered, the entry 24 can be discerned from the pattern 4. The exemplary number of frames is for illustrative purposes, and is not intended to be limiting. An attacking computer attempting to "read" the entry object 24 of the challenge-response test would need to overlay several frames of the challenge-response test and analyze the frames to determine if the entry object 24 can be discerned. Or the attacking computer would need to analyze the motion of the pattern 4, which would be computationally expensive if the pattern 4 is randomized.

Figure 4A:
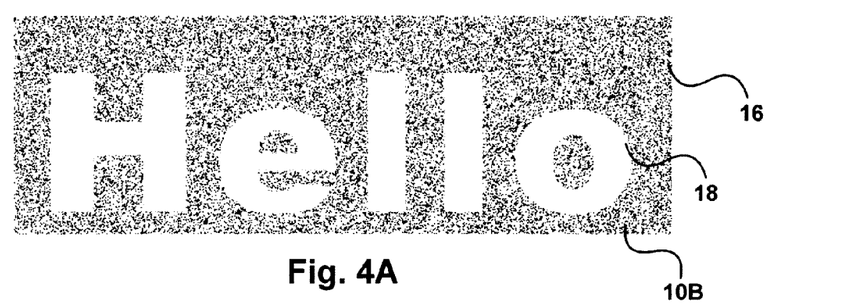
FIGS. 4A-B illustrate a foreground sampling window and a background sampling window capturing graphical elements from a random pattern, in accordance with one embodiment of the present invention.
Figure 4B:
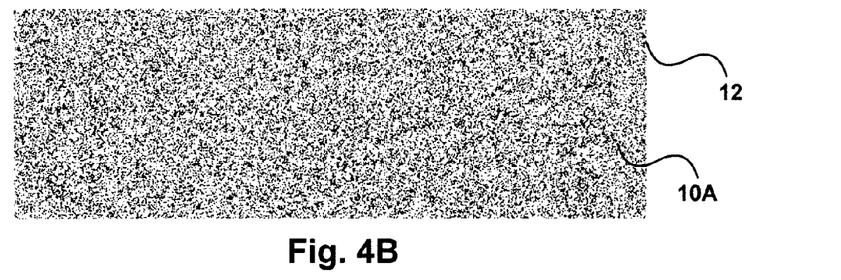

FIGS. 4A-B illustrate a foreground sampling window and a background sampling window capturing graphical elements from a random pattern, in accordance with one embodiment of the present invention. The pattern used in the challenge-response test can have the graphical elements 10A and 10B in the form of dots distributed in a substantially random, but uniform pattern. The foreground sampling window 16 captures graphical elements 10B of the pattern, except in the non-patterned area 18, as illustrated in FIG. 1C. The non-patterned area 18 of the foreground sampling window 16 forms the entry object of the challenge-response test, in this case the word "Hello". In one embodiment, the graphical elements 10B of the pattern captured by the foreground sampling window 16 are dots with a substantially uniform distribution, as illustrated in FIG. 4A. Similarly, the background sampling window 12 captures dots 10A of the pattern that have a substantially uniform distribution, as discussed above. As discussed above in reference to FIG. 3, when the graphical elements 10B of the foreground sampling window 16 are overlaid over the graphical elements 10A of the background sampling window 12, the entry object formed by the non-patterned area 18 is discernable due to the differing move vector of the foreground sampling window 16 relative to the background sampling window 12.

Figure 5A:
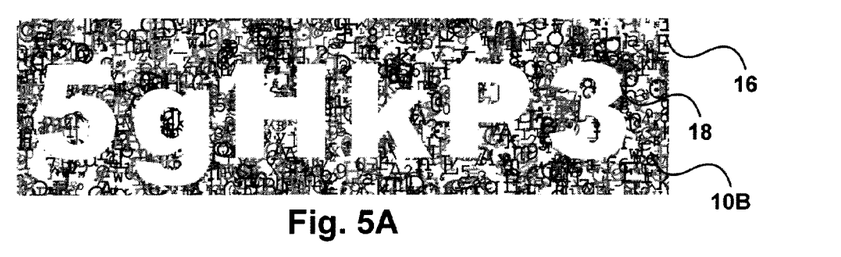
FIGS. 5A-C illustrate a foreground sampling window, a background sampling window capturing graphical elements from a random pattern, and a simulated rendering of multiple frames of the challenge-response test, in accordance with one embodiment of the present invention.
Figure 5B:
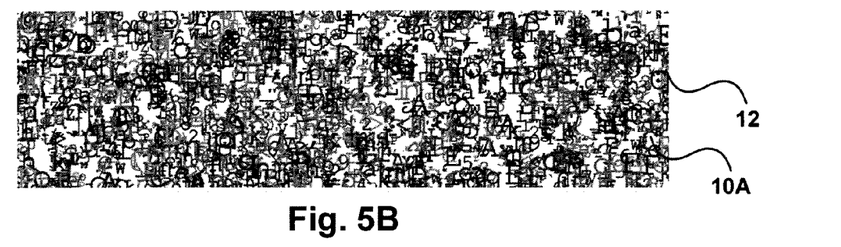
Figure 5C:
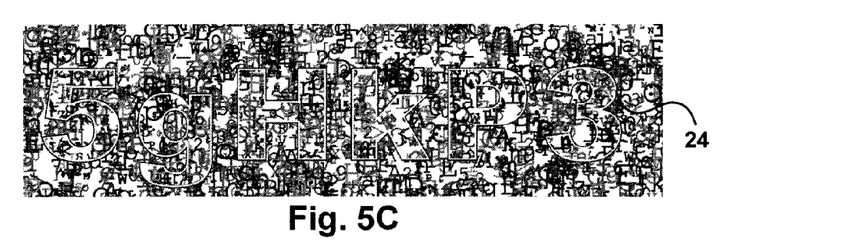

FIGS. 5A-C illustrate a foreground sampling window, a background sampling window capturing graphical elements from a random pattern, and a simulated rendering of multiple frames of the challenge-response test, in accordance with one embodiment of the present invention. As discussed above, the pattern can be implemented using alpha-numeric characters as the graphical elements 10A and 10B. FIG. 5A illustrates the foreground sampling window 16 that captures alpha-numeric characters 10A of the pattern, except in the non-patterned area 18 as illustrated in FIG. 1C. The non-patterned area 18 is defined by the entry object with the characters "5gHkP3". FIG. 5B illustrates the background sampling window 12 capturing the alpha-numeric characters of the pattern. FIG. 5C simulates rendering of multiple frames where the alpha-numeric characters 10B of the foreground sampling window 16 are overlaid over the corresponding alpha-numeric characters 10A of the background sampling window. As illustrated in FIG. 5C, the entry object 24 "5gHkP3" is discernable in the period of time where multiple frames of the challenge-response test are rendered. Specific entry objects 24 of the challenge-response test are for illustrative purposes, but are not limiting.

Figure 6:
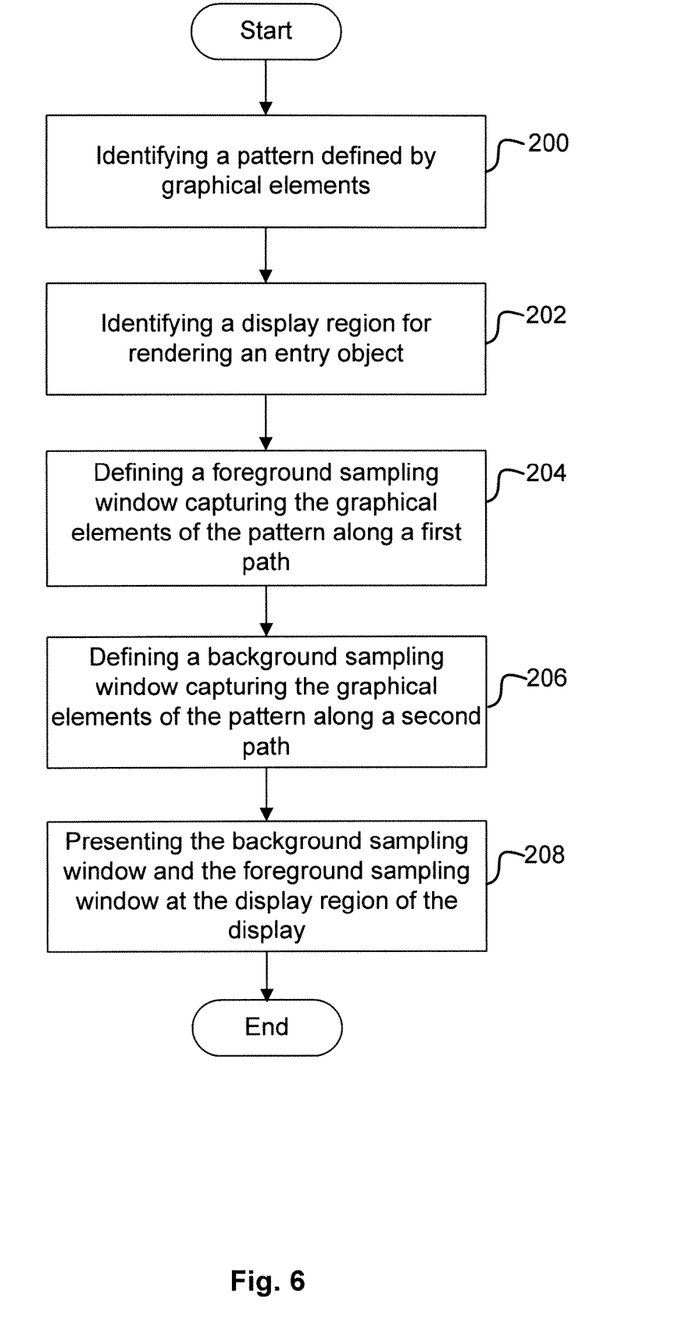
FIG. 6 illustrates the method operations involved in generating a multi-frame image rendering of a challenge-response test, in accordance with one embodiment of the present invention.

FIG. 6 illustrates the method operations involved in generating a multi-frame image rendering of a challenge-response test, in accordance with one embodiment of the present invention. The method begins with operation 200 where a pattern defined by graphical elements is identified. As illustrated in FIGS. 1A1-5, the graphical elements may include dots, alpha-numeric characters, lines, etc. The method advances to operation 202 where a display region for rendering an entry object of the challenge-response test is identified. In one embodiment, the display region for rendering the entry object can be located on a webpage, as illustrated in FIG. 1D.

In operation 204, a foreground sampling window that captures the graphical elements of the pattern along a path is defined. In one embodiment, the foreground sampling window includes a non-patterned area that does not capture the graphical elements of the pattern, as illustrated in FIG. 1C. Still further, the foreground sampling window captures graphical elements of the pattern along the path with an associated rate of movement, as illustrated in FIGS. 2A-D. Operation 206 defines a background sampling window that captures graphical elements of the pattern along another path. In one embodiment, the path associated with the background sampling window is not equal to the path associated with the foreground sampling window, as illustrated in FIGS. 2A-B. Still further, the path of the background sampling window is associated with a move vector that is not equal to the move vector of the foreground sampling window, as discussed in reference to FIG. 3.

In operation 208, the background sampling window and the foreground sampling window are presented in the display region of the display. In one embodiment, an overlay engine overlays samples of the foreground sampling window over corresponding samples of the background sampling window. The overlaid samples of the foreground sampling window and the background sampling window are rendered by a display renderer, as discussed in reference to FIG. 3. Still further, the entry object of the challenge-response test is discernable from the pattern during a period of time where multiple frames are rendered. In one embodiment, the entry object of the challenge-response test can be a non-textual shape with a corresponding multiple choice challenge. For example, an entry object of the challenge response test could be a picture of a dog with a corresponding multiple choice question of "do you see a car, a cat, or a house?"

Figure 7:
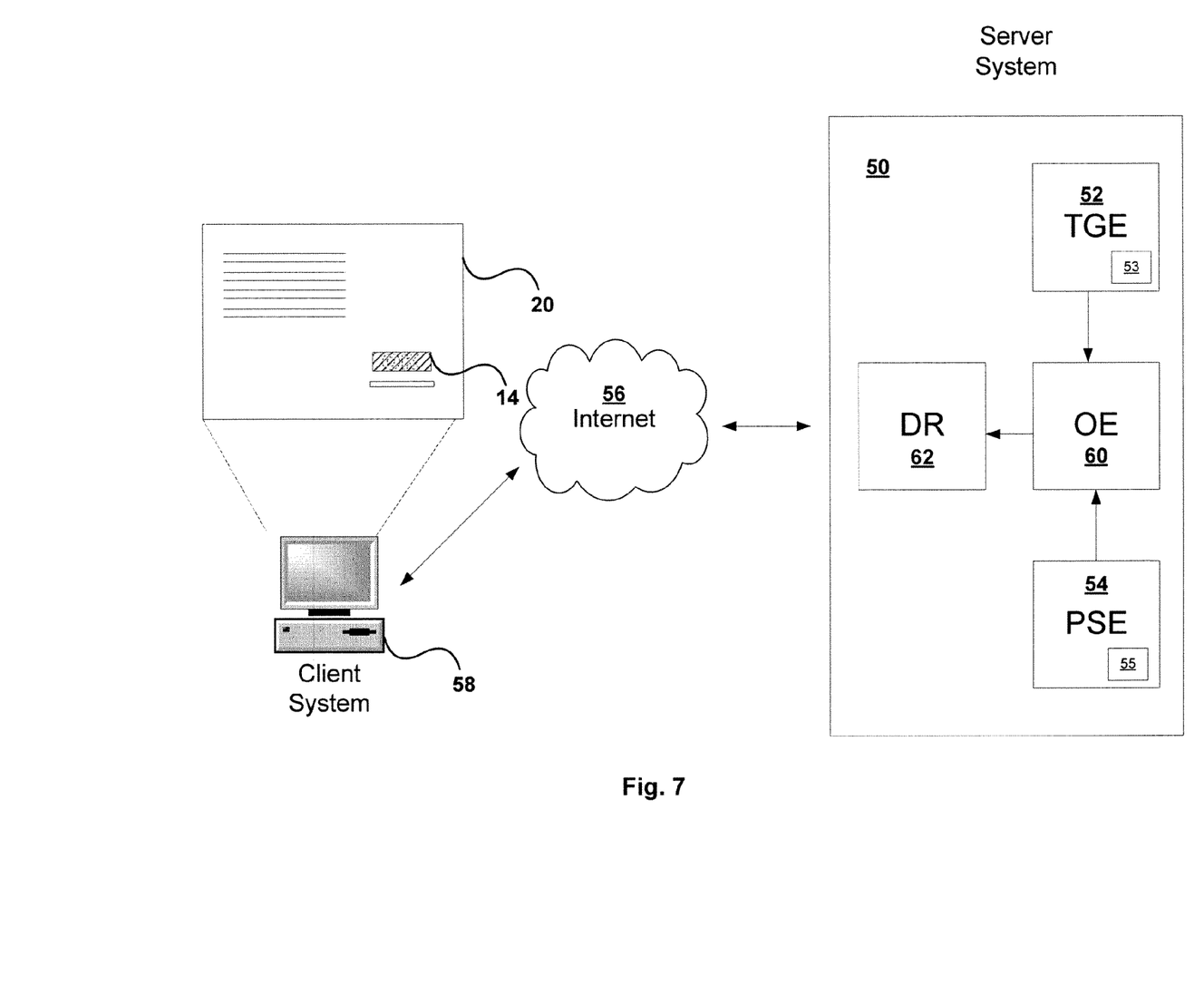
FIG. 7 illustrates a system for generating a multi-frame image rendering of a challenge-response test, in accordance with one embodiment of the present invention.

FIG. 7 illustrates a system for generating a multi-frame image rendering of a challenge-response test, in accordance with one embodiment of the present invention. In response to a request by a client system 58 for content available through a webpage 20, the server system 50 generates the multi-frame image rendering of the challenge-response test. The server system 50 includes a test generation engine (TGE) 52, which generates the entry object of the multi-frame image of the challenge-response test, and identifies a pattern defined by graphical elements. In one embodiment, the entry object of the challenge-response test uses non-Latin characters. Still further, the test generation engine 52 can also include a pattern generation engine 53 to dynamically modify the pattern defined by graphical elements.

The server system 50 may further include a pattern sampling engine (PSE) 54 for defining the foreground sampling window and a background sampling window. In one embodiment, as illustrated in FIG. 1C, the foreground sampling window has a non-patterned area that is defined by the entry object of the challenge-response test that is generated by the test generation engine 52. In addition, the foreground sampling window of the pattern sampling engine 54 captures the graphical elements of the pattern while moving in a path along the pattern. Similarly, the background sampling window defined by the pattern sampling engine 54 captures the graphical elements of the pattern generated by the test generation engine 52 as the background sampling window moves along another path across the pattern. In one embodiment, as illustrated in FIG. 2D, the paths of the background sampling window and the foreground sampling window are substantially the same, but the rate of movement of the foreground sampling window and the background sampling window are different. Still further, pattern sampling engine 54 may include a window position engine 55 for moving the position of the foreground sampling window along the path across the pattern and the position of the background sampling window along another path when capturing graphical elements of the pattern.

The overlay engine (OE) 60 of the server system 50 overlays the graphical elements captured by the foreground sampling window over the corresponding graphical elements captured by background sampling window, as directed by the pattern sampling engine 54. The overlaid frames from the overlay engine 20 are transmitted to the display renderer (DR) 62 that renders a multiple frame loop of the challenge-response test. The multiple frame loop is transmitted to the client system 58 though the Internet 56. The entry object of the challenge-response test is discernable from the pattern when multiple frames are rendered on the display region 14 of the webpage 20.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a multi-frame image rendering of a challenge-response test on a display, comprising:
    identifying a pattern defined by graphical elements, wherein each of the graphical elements is associated with a random lifetime;
    identifying a display region on the display for rendering an entry object from the multi-frame image of the challenge-response test;
    defining a foreground sampling window with an associated move vector, the foreground sampling window capturing the graphical elements of the pattern along a first path across the pattern, and the foreground sampling window having a non-patterned area defined by the entry object to be rendered;
    defining a background sampling window with an associated move vector, the background sampling window capturing the graphical elements of the pattern along a second path across the pattern, wherein the move vector of the background sampling window is different from the move vector of the foreground sampling window; and
    presenting the background sampling window and the foreground sampling window at the display region of the display, the foreground sampling window being overlaid on the background sampling window at the display region, such that the entry object of the challenge-response test is discernable from the pattern during a period of time when multiple frames are rendered due to the differing move vectors and is not discernable when the sample frames of the foreground and background sampling windows are static, wherein after generating each frame, the lifetime of the graphical element is decremented, and wherein when the lifetime of the graphical element reaches zero, assigning a new random position and new random lifetime to the graphical element.

2. The method of claim 1, further comprising
    moving a position of the foreground sampling window along the first path when capturing graphical elements of the pattern; and
    moving the position of the background sampling window along the second path when capturing graphical elements of the pattern.

3. The method of claim 2, wherein the first and the second paths are equal, and a rate of moving the position the foreground sampling window is different than the rate of moving the position of the background sampling window.

4. The method of claim 1, wherein the graphical elements are selected from one of dots, shapes, lines, symbols, or input characters.

5. The method of claim 1, further comprising:
    initially placing the graphical elements of the pattern in a substantially uniform distribution.

6. The method of 1, further comprising:
    randomizing a location of a subset of graphical elements of the pattern after a specified time.

7. The method of claim 1, wherein the display region on the display is located in one of a webpage or a program screen.

8. The method of claim 1, wherein the entry object is an unaltered string of characters of a written language.

9. The method of claim 1, wherein the non-patterned area of the foreground sampling window defined by the entry object to be rendered forms a non-textual shape.

10. The method of claim 1, wherein the non-patterned area of the foreground sampling window defined by the entry object to be rendered is larger than the graphical elements.

11. A non-transitory computer storage medium including program instructions for generating a multi-frame image rendering of a challenge-response test, comprising:
    program instructions for identifying a pattern defined by graphical elements, wherein each of the graphical elements is associated with a random lifetime;
    program instructions for identifying a display region for rendering an entry object from the multi-frame image of the challenge-response test;
    program instructions for defining a foreground sampling window with an associated move vector, the foreground sampling window capturing the graphical elements of the pattern as a position of the foreground sampling window moves along a first path across the pattern, and the foreground sampling window having a non-patterned area defined by the entry object to be rendered;
    program instructions for defining a background sampling window with an associated move vector, the background sampling window capturing the graphical elements of the pattern as the position of the background sampling window moves along a second path across the pattern, wherein the move vector of the background sampling window is different from the move vector of the foreground sampling window; and program instructions for presenting the background sampling window and the foreground sampling window at the display region, the foreground sampling window being overlaid on the background sampling window at the display region, such that the entry object of the challenge-response test is discernable from the pattern during a period of time when multiple frames are rendered due to the differing move vectors and is not discernable when the sample frames of the foreground and background sampling windows are static, wherein after generating each frame, the lifetime of the graphical element is decremented, and wherein when the lifetime of the graphical element reaches zero, assigning a new random position and new random lifetime to the graphical element.

12. The computer storage medium of claim 11, wherein the first and second paths are equal, and the foreground sampling window has a different initial position than the background sampling window.

13. The computer storage medium of claim 11, further comprising:

program instructions for randomly varying a location of the graphical elements of the pattern after a period of time.

14. The computer storage medium of claim 13, wherein randomly varying a location of the graphical elements of the pattern after the period of time further comprises:

program instructions for selecting one of (i) assigning a random initial position for each graphical element, (ii) assigning a random time period each graphical element is moved to a new position, or (iii) assigning a random variation in the position of each graphical element.

15. The computer storage medium of claim 11, further comprising:

program instructions for segmenting the foreground sampling window into multiple regions, such that each region contains an unbroken portion of the entry object; and program instructions for moving each region of the foreground sampling window along a different path.

16. The computer storage medium of claim 11, further comprising:

program instructions for transmitting the foreground sampling window overlaid on the background sampling window for rendering at the display region of the display.

17. A computing system for authenticating access using a multi-frame rendering of a challenge-response test, comprising:

a processor including, a test generation engine for generating an entry object of a multi-frame image of the challenge-response test, and identifying a pattern defined by graphical elements, wherein each of the graphical elements is associated with a random lifetime;

a pattern sampling engine for defining a foreground sampling window with an associated move vector and a background sampling window with an associated move vector, the foreground sampling window having a non-patterned area defined by the entry object of the test generation engine and capturing the graphical elements of the pattern while moving in a first path along the pattern, and the background sampling window capturing the graphical elements of the pattern as the background sampling window moves along a second path across the pattern, wherein the move vector of the background sampling window is different from the move vector of the foreground sampling window;

an overlay engine for overlaying contents of the background sampling window and the foreground sampling window, the foreground sampling window being overlaid on the background sampling window; and a display renderer engine that renders the entry object of the challenge-response test in multiple frames, such that the entry object is discernable from the pattern when multiple frames are rendered due to the differing move vectors and is not discernable when the sample frames of the foreground and background sampling windows are static, wherein after generating and rendering each frame, the lifetime of a particular graphical element that makes up the pattern is decremented, and wherein when the lifetime of the particular graphical element reaches zero, a new random position and new random lifetime is assigned to the graphical element.

18. The computing system of claim 17, wherein the pattern sampling engine further comprises:

a window position engine for moving a position of the foreground sampling window along the first path and the position of the background sampling window along the second path when capturing graphical elements of the pattern.

19. The computing system of claim 17, wherein the test generation engine further comprises:

a pattern generation engine to dynamically modify the pattern defined by graphical elements over time.

20. The computing system of claim 19, wherein the pattern randomizing engine assigns a random initial position for each graphical element, a random time period in which each graphical element is moved to a new position, and a random variation in the position of each graphical element.

* * * * *